(12) United States Patent
Stinson

(10) Patent No.: US 6,493,556 B1
(45) Date of Patent: Dec. 10, 2002

(54) APPARATUS AND METHOD FOR MESSAGE ROUTING USING DISPARATE COMMUNICATIONS NETWORKS

(75) Inventor: Michael Keith Stinson, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/384,988

(22) Filed: Aug. 30, 1999

(51) Int. Cl.[7] .................. H04Q 7/20; H04M 11/00; H04B 7/185

(52) U.S. Cl. ............... 455/445; 455/12.1; 455/406; 455/428; 455/430

(58) Field of Search .................. 455/12.1, 13.1, 455/406, 426, 427–430, 445

(56) References Cited

U.S. PATENT DOCUMENTS

| | | | |
|---|---|---|---|
| 5,287,541 A | | 2/1994 | Davis et al. ............... 455/12.1 |
| 5,640,386 A | | 6/1997 | Wiedeman .................. 370/320 |
| 6,005,926 A | * | 12/1999 | Mashinsky .................. 379/114 |
| 6,067,452 A | * | 5/2000 | Alexander .................. 455/428 |
| 6,226,365 B1 | * | 5/2001 | Mashinsky .................. 379/112 |

FOREIGN PATENT DOCUMENTS

| | | | |
|---|---|---|---|
| EP | 0824295 | 2/1998 | ............ H04M/7/00 |
| EP | 0848560 | 6/1998 | ............ H04Q/3/00 |
| EP | 0 848 560 A2 * | 6/1998 | ............ H04Q/3/00 |
| WO | 9917506 | 4/1999 | ............ H04L/12/66 |

* cited by examiner

Primary Examiner—Edward F. Urban
Assistant Examiner—Meless Zewdu
(74) Attorney, Agent, or Firm—Frank J. Bogacz

(57) ABSTRACT

A master routing hub (50, FIG. 1) selects a communications path which enables subscriber units (10, 140) using disparate networks to communicate with each other. The master routing hub (50) receives a quality of service indicator (FIG. 4, 410) from a subscriber unit (FIG. 1, 10) as well as cost information from alternate communications networks and terrestrial communications networks. The master routing hub (50) selects an appropriate communications path in accordance with the quality of service indicator and thus provides the best available quality of service at the lowest cost to the subscribers (10, 140). The master routing hub (50) also provides the protocol conversion in order to enable the disparate communications networks to communicate with each other.

21 Claims, 3 Drawing Sheets

APPARATUS AND METHOD FOR MESSAGE ROUTING USING DISPARATE COMMUNICATIONS NETWORKS

FIELD OF THE INVENTION

The invention relates generally to the field of communications and, more particularly, to communications among disparate communication networks.

BACKGROUND OF THE INVENTION

In a communications network, a subscriber often has a desire for a service from a provider which does not operate within the particular communications network. In order to receive the desired service, the subscriber may be required to establish an account with a second communications network, or make other arrangements which allow the subscriber to receive the desired service. These arrangements can require the subscriber to purchase or otherwise secure the equipment necessary to interact with the second communications network.

Arrangement between service providers can become complex and difficult to implement especially when the desired service is only available on a communications network which provides regional coverage. In these cases, arranging for the service to be provided to an out-of-area subscriber introduces further complications. Additionally, the subscriber may have little or no control over the quality of service provided by the second communications network at the out-of-area location.

As communications providers attempt to establish and increase market share, each provider strives to offer their own unique service package and to exclude competitors from the marketplace. Additionally, service providers are reluctant to offer key services of their own communications networks using competitor's delivery systems as these delivery systems may be viewed as not offering the highest quality of service. These factors discourage users from making use of services not offered by their "home" communications network. Additionally, these factors also discourage communications service providers from offering their services to subscribers not committed to use their communications network and its attendant equipment.

Thus, it is highly desirable to allow communications service providers to offer their services to subscribers outside the communications network using a suitable quality of service. Additionally, it is also highly desirable for subscriber units to be capable of obtaining communications services which are not offered by a home communications network.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DESCRIPTION OF THE PREFERRED EMBODIMENTS

A method and system for message routing using disparate communication networks allows subscribers to easily access services offered by providers other than their current service provider. At the same time, the method and system allows service providers to offer services to customers outside of their current subscribers. Further, a quality of service indicator can be used by a subscriber to specify the type of communications path which is desired. Finally, the method and system allows a communications network to offer resources, such as network bandwidth during off-peak hours in order to generate revenue when the demand is low within the particular communications network. These factors allow greater cooperation among service providers while providing increased availability of desired services to subscribers.

Figure 1:
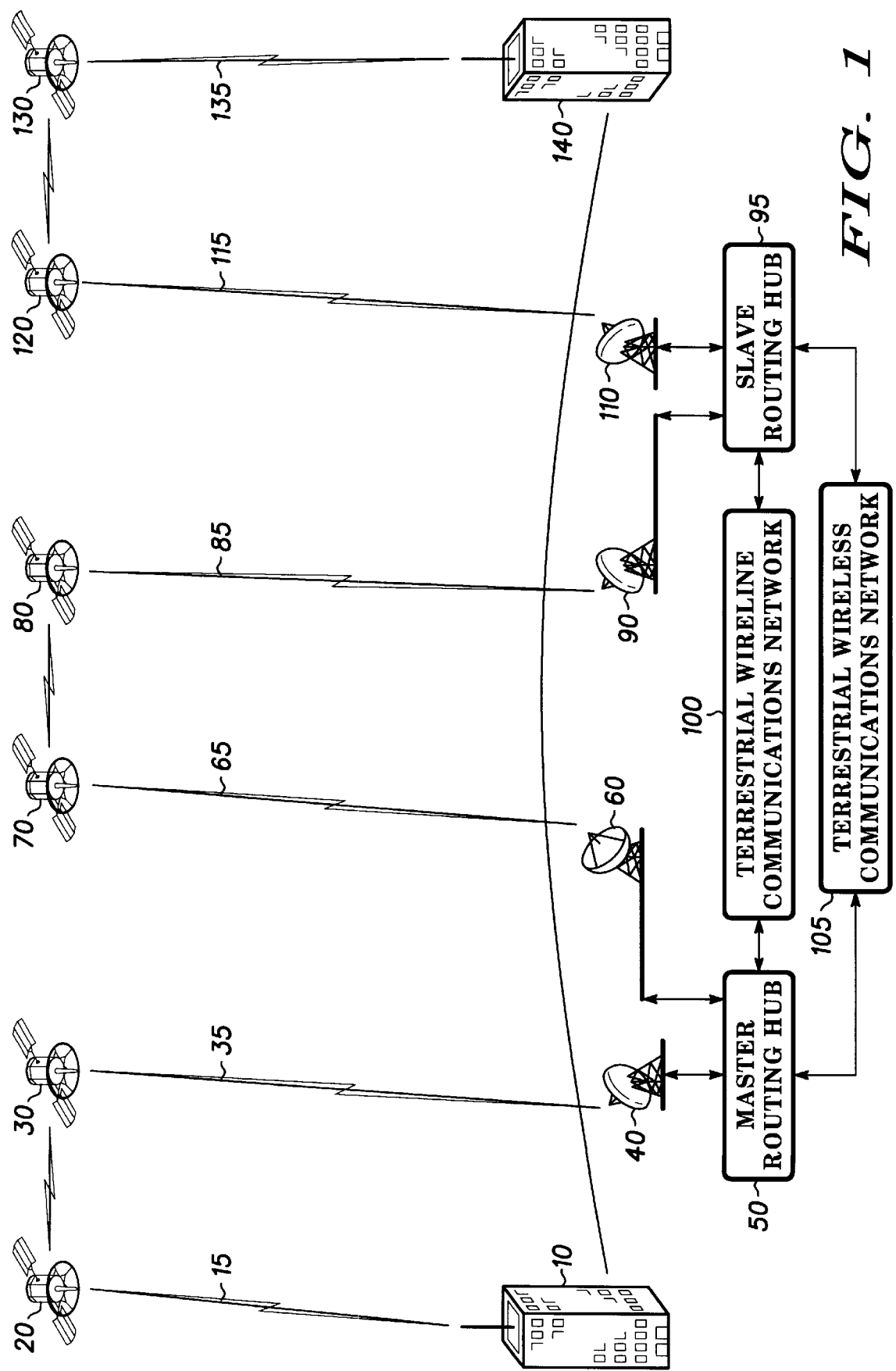
FIG. 1 is a block diagram of two subscriber units communicating using disparate communications networks in accordance with a preferred embodiment of the present invention.

FIG. 1 is a block diagram of two subscriber units communicating using disparate communications networks in accordance with a preferred embodiment of the present invention. In FIG. 1, subscriber units 10 and 140 are initiating a bi-directional communications session. This session may consist of digital messaging between subscriber units 10 and 140, such as e-mail or a chat room, or other type of interactive service. In an alternate embodiment, subscriber unit 140 may be representative of a particular service which subscriber unit 10 wishes to access. Thus, for example, subscriber unit 140 can represent a source of a particular service such as news, stock quotes, or multicast video.

Figure 2:
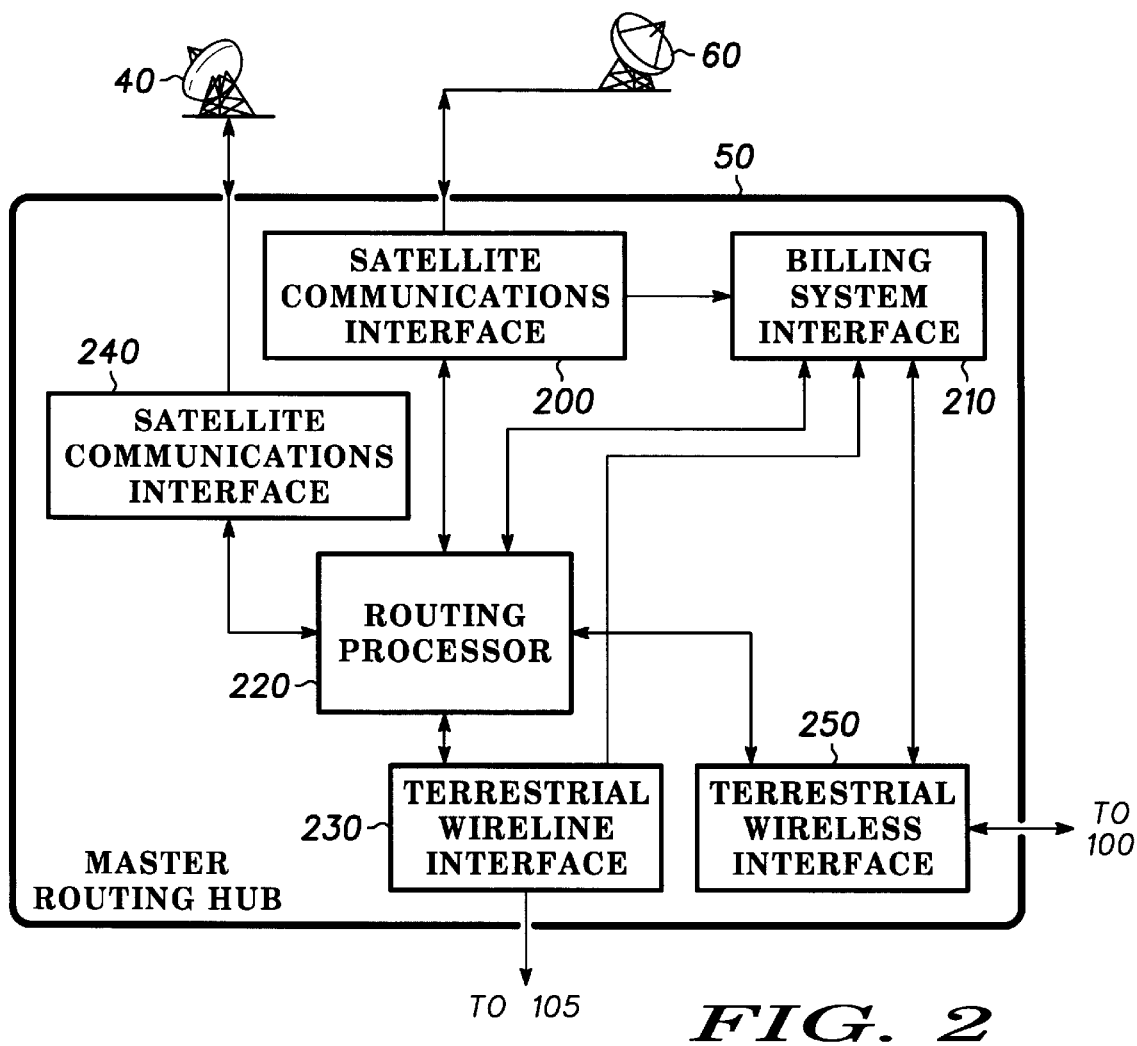
FIG. 2 is a block diagram of the master routing hub (50) of FIG. 1 which provides message routing using disparate communications networks in accordance with a preferred embodiment of the invention.

In a preferred embodiment, subscriber unit 10 communicates with satellite 20 through communications link 15. Satellite 20 may communicate directly with ground station 40 or may communicate indirectly with ground station 40 through an intersatellite communications link with satellite 30 and communications link 35. Satellites 20 and 30 are representative of a global or regional satellite communications network which does not directly communicate with satellites 70, 80, 120, or 130 of FIG. 1. Thus, satellites 20 and 30 represent a stand alone satellite communications network that provides communications among many subscriber units, such as subscriber unit 10, and provides a particular range of communications services. Additionally, satellites 70 and 80 of FIG. 2 are representative of an intervening satellite communications network which provides a particular range of services for its own group of subscribers. Finally, satellites 120 and 130 are representative of a communication network which provides services to subscriber unit such as subscriber unit 140.

A message originating from subscriber unit 10 is routed through satellites 20 and 30 to ground station 40 which conveys the message to master routing hub 50. In a preferred embodiment, master routing hub 50 also receives a desired quality of service indicator from subscriber unit 10. This quality of service indicator provides master routing hub 50 with an indication of the desired quality of communications path between subscriber units 10 and 140. For example, the quality of service indicator can specify a maximum latency in data transmitted to and receive from subscriber unit 10, or can specify a minimum limit of channel bandwidth in the communications path. Additionally, the quality of service indicator can specify a maximum number of errors (such as a bit error rate) in a data packet transmitted to or received from subscriber unit 10.

Preferably, master routing hub 50 receives information regarding a cost of routing data between subscriber units 10 and 140. It is contemplated that this cost information is expressed in terms of a cost for a particular level of quality of service. For example, satellite 70 may communicate a cost schedule for various types of services offered by the satellite communications network represented satellites 70 and 80. It is expected that a lower quality of service communications path will be more economical, while a higher quality of service communication path, such as a path having properties of lower latency and/or higher bandwidth, will be offered at a premium price.

Preferably, the quality of service versus cost schedule will be expressed as a function of time of day and can be updated at any time by the particular terrestrial or satellite network. When the satellite communications network represented by satellites 70 and 80 serves only a particular regional coverage area, the time of day can be referenced to the coverage area served by the network. This allows the satellite communications network represented by satellites 70 and 80 to offer data back haul services during off-peak hours. Additionally, terrestrial wireline or wireless communications networks 100 and 105 can offer similar data back haul services during off-peak hours. Further, in the event that terrestrial wireline or wireless communications networks 100 and 105 offer services over a regional coverage area, time of day can also be referenced to the coverage area served by the network. Finally, the time of day can also be expressed as a time of day at the location of one of subscriber units 10 and 140.

Thus, master routing hub 50 can select the most economical and highest quality communications path between subscriber units 10 and 140 which is available at any given time. This provides subscriber units 10 and 140 with a manner of optimizing the communications path between them reducing the associated cost to the lowest possible level.

After the selection of a communications path through either or both of satellites 70 and 80, terrestrial wireline communications network 100, or terrestrial wireless communications network 105, the message is provided to slave routing hub 95. Depending on the communications path selected by master routing hub 50, the message is conveyed through communications link 65, through one or more of satellites 70 and 80, through communications link 85 to ground station 90 and to slave routing hub 95. Alternatively, the message can be communicated to slave routing hub 95 through terrestrial wireline communications network 100 or through terrestrial wireless communications network 105.

Upon receipt of the message, slave routing hub 95 converts the message to the format used by satellites 120 and 130, and up links the message through communications link 115 using ground station 110. The message is then routed through the satellite communications network represented by satellites 120 and 130 to subscriber unit 140 through communications link 135. For communications in the return direction, from subscriber unit 140 to subscriber unit 10, slave routing hub 95 preferably ensures that messages are routed using substantially the same communications path chosen by master routing hub 50. Slave routing hub 95 preferably also performs the required conversion and proper formatting for the return direction as well.

It is noteworthy that the communications path chosen by master routing hub 50 may include a combination of terrestrial wireless, wireline, and satellite communications resources, as opposed to selecting a communications which makes use of any single communications network type. Thus, master routing hub 50 can select a communications path which involves the satellite communications network represented by satellites 70 and 80 for a first portion of the path between subscriber units 10 and 140, and select terrestrial wireless communications network 105 for a second portion of the path.

Although FIG. 1 depicts subscriber units 10 and 140 being coupled to satellites as communications nodes, the present invention is not limited requiring the subscriber units to be coupled to satellite communications resources. Thus, subscribers 10 and 140 may be more directly coupled to master routing hub 50 and slave routing hub 95 through a portion of the terrestrial wireline infrastructure.

FIG. 2 is a block diagram of the master routing hub (50) of FIG. 1 which provides message routing using disparate communications networks in accordance with a preferred embodiment of the invention. In FIG. 2, information regarding a cost of routing data through the network represented by satellites 70 and 80 is received by satellite communications interface 200 through ground station 60. This information is provided to billing system interface 210. Preferably, billing system interface 210 includes the necessary network interface converters needed to convert billing system information from the disparate satellite and terrestrial communications networks to a format which can be interpreted by routing processor 220. Thus, billing system interface 210 can interface with the billing systems of multiple terrestrial wireless, terrestrial wireline, and satellite communications networks in order to provide a variety of candidate communications paths for optimization by routing processor 220 in order to determine the most economical communications path which provides the requested quality of service.

When routing processor 220 selects the optimal communications path, communications data between subscriber units 10 and 140 is routed along the chosen path using satellite communications interface 240 to communicate with subscriber 10 through ground station 40. In a preferred embodiment, routing processor makes use of satellite communication interface 200, terrestrial wireline interface 230, or terrestrial wireless interface 250. In the event that a communications path having the desired quality of service is not available, routing processor 220 can select a path having the next highest quality of service, and make use of that path until a more suitable path becomes available.

Routing processor 220 additionally functions to perform any required conversion between the disparate communications networks. This ensures that messages are conveyed through a selected communications path using a format which is native to the selected communications network. Additionally, routing processor 220 also functions to convert messages originating from subscriber unit 140 to the format used by the communications network which serves subscriber 10.

In the event that subscribers 10 and 140 of FIG. 1 are subscribers of terrestrial communications networks, routing processor 220 provides communications path selection and conversion between disparate terrestrial communications networks through terrestrial wireline interface 230 and terrestrial wireless interface 250.

Figure 3:
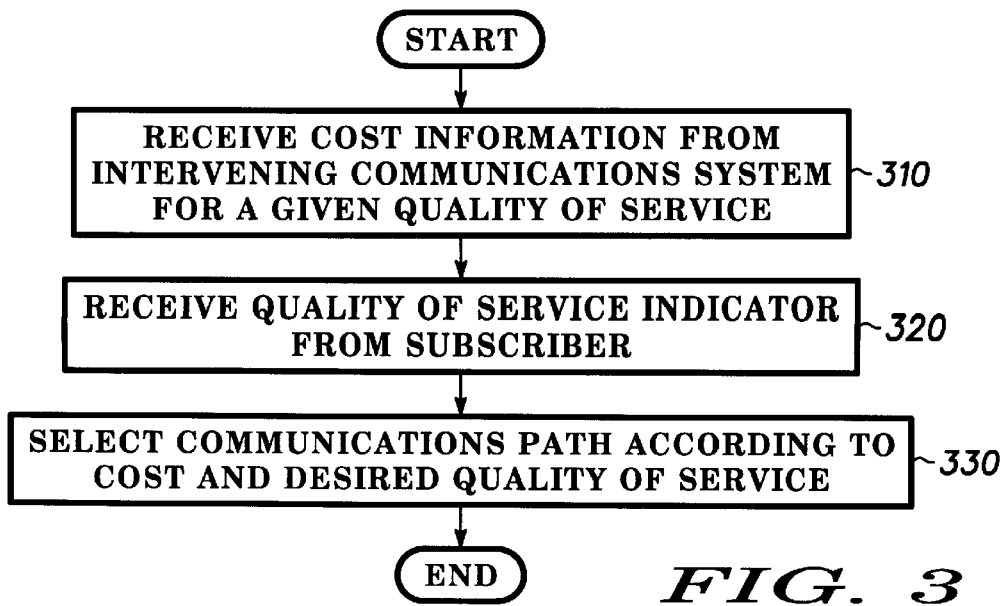
FIG. 3 is a flow chart of a method executed by a master routing hub in order to facilitate message routing using disparate communications networks in accordance with a preferred embodiment of the invention.

FIG. 3 is a flow chart of a method executed by a master routing hub in order to facilitate message routing using disparate communications networks in accordance with a preferred embodiment of the invention. FIG. 3 begins with step 310 in which the master routing hub receives cost information from an intervening communications network for a particular quality of service. In a preferred embodiment, the intervening communications network can be either a satellite based, or terrestrial-based wireless or wireline network which lies between the communications networks that serve a particular pair of subscriber units. Step 310 is desirably executed more than once in order to receive cost information from more than one intervening communications network and to receive timely updates from the intervening communications networks.

At step 320, the master routing hub receives a quality of service indicator from a subscriber unit. This quality of service indicator can specify parameters such as a maximum latency of the communications path, a maximum number of errors induced by the effects of the selected communications path (such as a bit error rate), or a minimally acceptable bandwidth of the communications path.

In step 330, the master routing hub selects a communications path according to a cost and a desired quality of service. This communications path can include using one or more types of communications networks, such as a combination of satellite and terrestrial communications resources, in order to provide a communications path between subscriber units which provides the highest possible quality of service, at the lowest possible price.

Figure 4:
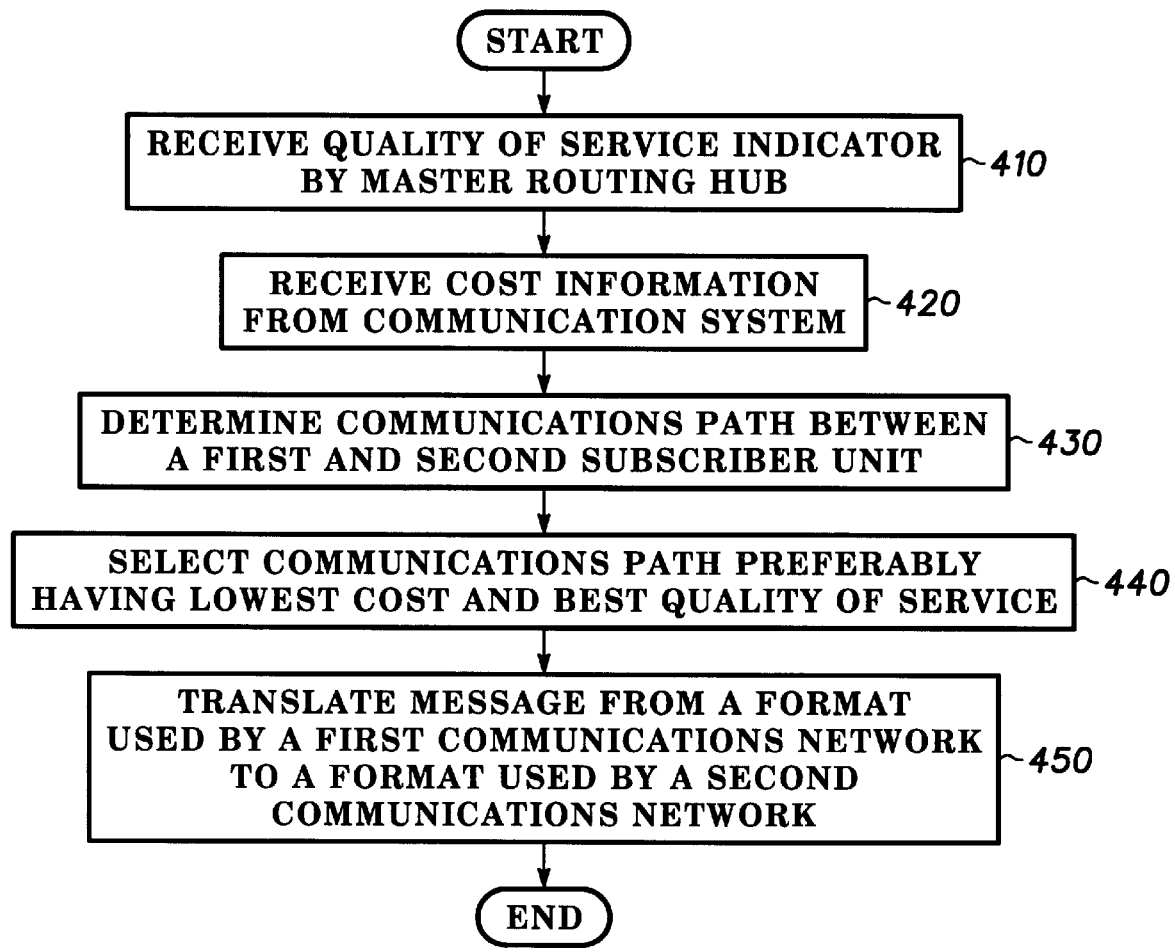
FIG. 4 is a flow chart of a method executed within a communications network which facilitates message routing using disparate communications networks in accordance with a preferred embodiment of the invention.

FIG. 4 is a flow chart of a method executed within a communications network which facilitates message routing using disparate communications networks in accordance with a preferred embodiment of the invention. The method of FIG. 4 begins with step 410 where a master routing hub receives a quality of service indicator from a subscriber unit. At step 420, the master routing hub receives cost information from a communications network. In step 430, the master routing hub determines a suitable communications path between the subscriber units which provides the desired quality of service (if a communications path having the desired characteristics is available). At step 440, a particular communications path is selected in accordance with the desired quality of service. At step 450, the message is translated from a format used by a communications first communications network to a format used by a second communications network.

A method and system for message routing using disparate communication networks allows service providers to offer services to customers outside of their current subscribers. Additionally subscribers of a particular communications network can make use of services offered by providers outside of their home network. Finally, the method and system allows a communications network to offer resources, such as network bandwidth during off-peak hours in order to generate revenue when the demand is low within the particular communications network. These factors allow greater cooperation among service providers while providing increased availability of desired services to subscribers.

Accordingly, it is intended by the appended claims to cover all of the modifications that fall within the true spirit and scope of the invention.

What is claimed is:

1. A method for establishing a communications path between first and second subscriber units, wherein said first subscriber unit is interfaced to a first communications network and said second subscriber unit is interfaced to a second communications network, said method comprising the steps of:

receiving by a master routing hub information regarding a cost of routing data between said first and second communications networks expressed as a function of a time of day at a location of one of said first or second subscriber units;

receiving a quality of service indicator from at least one of said first and second subscriber units;

determining a communications path between said first and second subscriber units based on an optimization of said cost of routing and said quality of service indicator;

routing by the master routing hub to the first subscriber via one of a plurality communications networks based on the optimization, the plurality of communications networks including said first and second communications networks;

routing by the master routing hub the first subscriber to a slave routing hub via one of the plurality of communications networks based on the optimization; and routing by the slave routing hub the second subscriber to the first subscriber by one of the plurality of communications networks based on the optimization.

2. The method of claim 1, wherein said receiving a quality of service indicator step further comprises the step of receiving an indicator which includes a maximum latency of said communications path.

3. The method of claim 1, wherein said receiving a quality of service indicator step further comprises the step of receiving an indicator which includes a minimum limit of channel bandwidth of said communications path.

4. The method of claim 1, wherein said receiving a quality of service indicator step further comprises the step of receiving an indicator which includes a maximum number of errors introduced by said communications path.

5. The method of claim 1, wherein said first and second communications networks are satellite communications networks.

6. The method of claim 1, wherein said first and second communications networks are terrestrial communications networks.

7. The method of claim 1, wherein said first communications network is a satellite communications network and said second communications network is a terrestrial communications network.

8. The method of claim 1, wherein said determining step further includes the step of selecting an intervening satellite communications network to serve as a portion of said communications path.

9. The method of claim 8, wherein said receiving a quality of service indicator step includes receiving information which is expressed as a function of a time of day within a coverage area of said intervening satellite communications network.

10. The method of claim 1, wherein said determining step further includes the step of selecting an intervening terrestrial communications network to serve as a portion of said communications path.

11. The method of claim 10, wherein said receiving information step includes receiving information which is expressed as a function of a time of day within a coverage area of said intervening terrestrial communications network.

12. The method of claim 1, wherein said determining step further comprises the step of selecting a communications path having a lowest cost and a highest quality of service.

13. A master routing hub for establishing a communications path between first and second subscriber units, wherein said first subscriber unit is interfaced to a first communications network and said second subscriber unit is interfaced to a second communications network, comprising:

- a first receiver for receiving information regarding a cost of routing data between said first and second communications networks expressed as a function of a time of day at a location of one of said first or second subscriber units;
- a second receiver for receiving a quality of service indicator from at least one of said first and second subscriber units;
- a processor for determining a communications path between said first and second subscriber units based on an optimization of said cost of routing and said quality of service indicator;
- means for routing the first subscriber to the master routing hub via one of a plurality of communications networks based upon the optimization, said plurality of communications networks including the first and second communications networks;
- means for routing the first subscriber to a slave routing hub via one of the plurality of communications networks based upon the optimization.

14. The master routing hub of claim 13, wherein said quality of service indicator includes a minimum limit of channel bandwidth of said communications path.

15. The master routing hub of claim 13, wherein said quality of service indicator includes a maximum number of errors introduced by said communications path.

16. The master routing hub of claim 13, wherein said quality of service indicator includes a maximum latency of said communications path.

17. The master routing hub of claim 13, wherein said optimization determines a highest degree of quality of service at a lowest cost based on said quality of service indicator.

18. The master routing hub of claim 13, wherein said first communications network is a satellite communications network.

19. The master routing hub of claim 13, wherein said first communications network is a terrestrial communications network.

20. The master routing hub of claim 13, wherein said first communications network is a satellite communications network, and said second communications network is a terrestrial based communications network.

21. The master routing hub as claimed in claim 13, wherein there is further included a slave routing hub for routing the second subscriber to the first subscriber via one of the plurality of communications networks based upon the optimization.

* * * * *

UNITED STATES PATENT AND TRADEMARK OFFICE
CERTIFICATE OF CORRECTION

PATENT NO. : 6,493,556 B1
DATED : December 10, 2002
INVENTOR(S) : Michael Keith Stinson It is certified that error appears in the above-identified patent and that said Letters Patent is hereby corrected as shown below:

Column 7,
Line 21, after "networks;" insert -- and --.

Signed and Sealed this

Twenty-eighth Day of June, 2005

JON W. DUDAS
*Director of the United States Patent and Trademark Office*